US006678427B1

(12) United States Patent
Kamimura

(10) Patent No.: US 6,678,427 B1
(45) Date of Patent: Jan. 13, 2004

(54) DOCUMENT IDENTIFICATION REGISTRATION SYSTEM

(75) Inventor: Takeshi Kamimura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/219,336

(22) Filed: Dec. 23, 1998

(30) Foreign Application Priority Data

Dec. 24, 1997 (JP) .............................................. 9-355631

(51) Int. Cl.⁷ ................................................. G06K 9/60
(52) U.S. Cl. ...................................... 382/306; 382/305
(58) Field of Search ................................ 382/238, 237, 382/239, 137, 165, 170, 180, 183, 181, 234, 254, 321, 236, 232, 305, 306; 358/3.06, 3.02, 426.07; 713/190, 182, 503; 213/153; 348/394.1; 345/596; 341/56

(56) References Cited

U.S. PATENT DOCUMENTS 3,905,045 A * 9/1975 Nickle .......................... 282/130
4,933,984 A * 6/1990 Nakano et al. .............. 382/238
5,583,950 A * 12/1996 Prokoski ..................... 382/212
5,628,008 A * 5/1997 Hayashi ....................... 395/603

FOREIGN PATENT DOCUMENTS

| JP | 61 59568 | 3/1986 |
| JP | 7-152856 | 6/1995 |
| JP | 9-138837 | 5/1997 |

* cited by examiner

Primary Examiner—Bhavesh M. Mehta
Assistant Examiner—Seyed Azarian

(57) ABSTRACT

A document identification registration system is provided for identification and registration of (constituent elements of) documents such as slips and notes of books. For example, the document identification registration system inputs digital picture data representing a picture of a slip, which is picked up by an image pickup device. From the digital picture data, the system extracts unregistered constituent elements such as characters and/or lines of rectangular frames, which are printed on the slip. From the constituent elements, the system selects a first constituent element to meet a prescribed condition. Then, the first constituent element is compared with the registered constituent elements, which are stored in advance. Next, the system further selects a second constituent element, which is clearly identified from the registered constituent elements, from the first constituent element on the basis of comparison result. So, the system registers the second constituent element therein. Thus, it is possible to perform identification of the slips with ease and with a high identification precision.

10 Claims, 4 Drawing Sheets

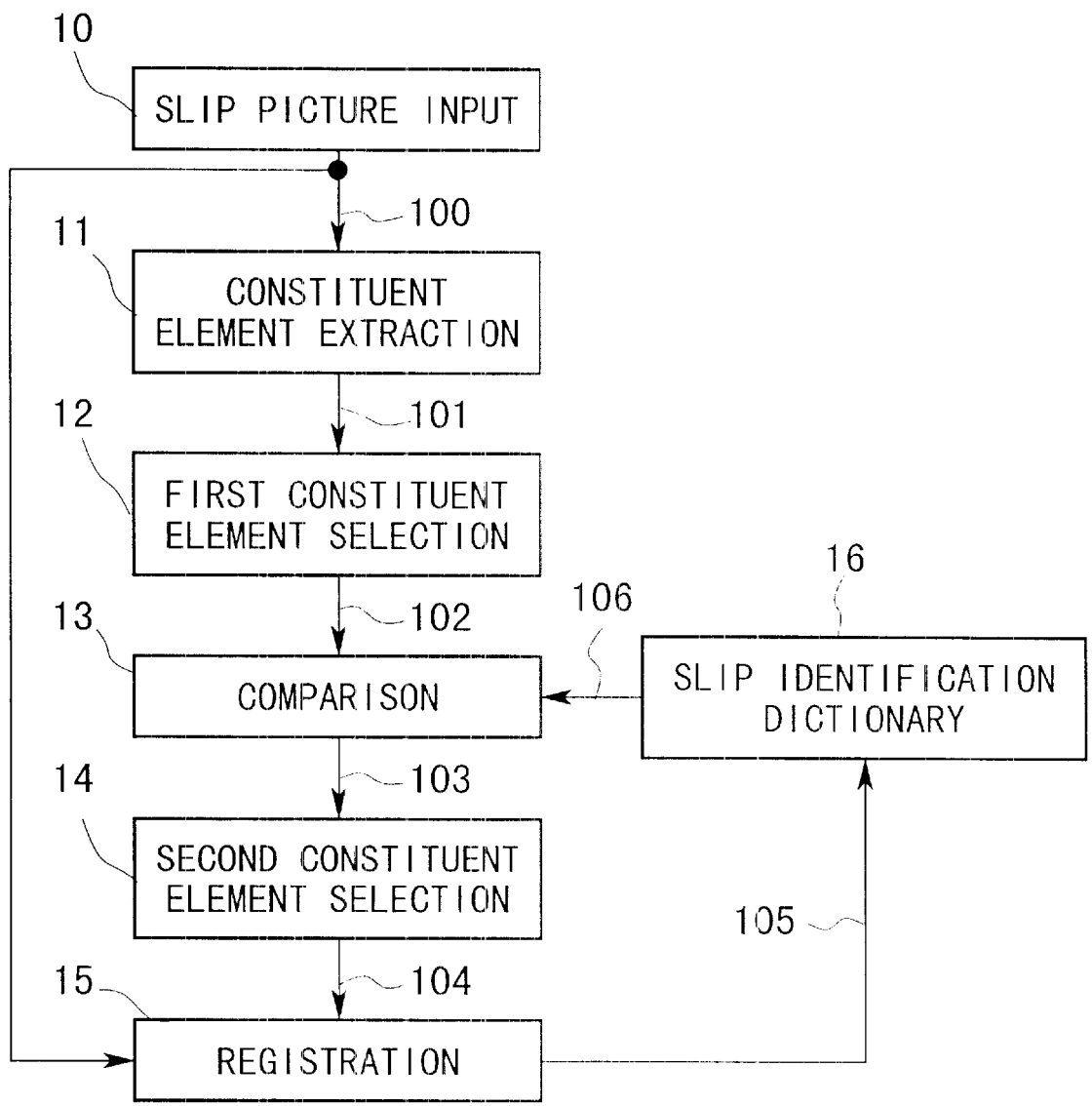

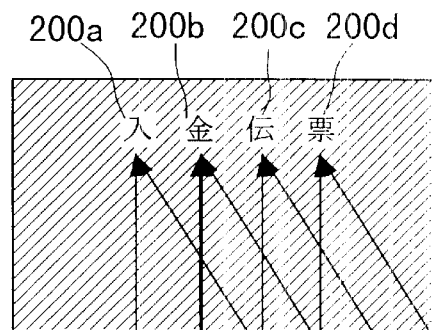
FIG.3A
FIG.3B
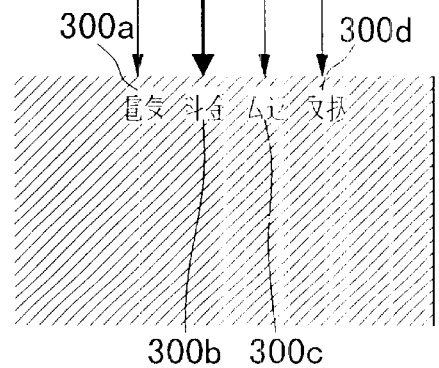
FIG.3C
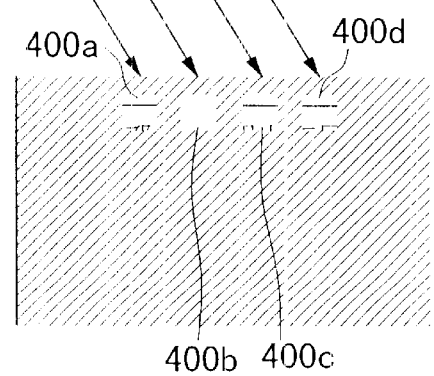

DOCUMENT IDENTIFICATION REGISTRATION SYSTEM

BACKGROUND OF THE INVENTION

1. Field of the Invention

This invention relates to document identification registration systems that are used for identification (or discrimination) of document types and registration (or entry) of information with respect to a variety of documents such as slips and notes of books.

This application is based on Patent Application No. Hei 9-355631 filed in Japan, the content of which is incorporated herein by reference.

2. Description of the Related Art

Conventionally, document identification registration systems are used to identify document types when collectively reading many kinds of documents together. ID characters are written on prescribed locations of the documents to represent their document types. Based on results of reading of the ID characters written on the documents, the document identification registration system determines formats suited to the documents. Then, the content of the document is read with respect to each field of the document in accordance with the format.

The paper of Japanese Patent Application, Publication No. Hei 7-152856 discloses a device that a human operator enters an identification area of a document, which is used for identification of a document type, in advance by operating a mouse.

By the way, banks and post offices issue a variety of notes in response to many kinds of businesses and duties. They sometimes deal with notes on which the aforementioned ID characters are not written.

Therefore, in the case of the businesses and duties of the banks and post offices, the conventional document identification registration system cannot identify the notes on which the ID characters are not written.

In addition the aforementioned device has a drawback that it takes an enormous amount of human work for registration of a plenty of documents. At a registration mode, it cannot perform verification whether the identification areas are effective or not. Therefore, the aforementioned device has a problem that an identification precision for identification of documents is relatively low.

SUMMARY OF THE INVENTION

It is an object of the invention to provide a document identification registration system that is capable of identifying documents on which ID characters are not written with a high identification precision.

A document identification registration system of this invention is provided for identification and registration of (constituent elements of) documents such as slips and notes of books. For example, the document identification registration system inputs digital picture data representing a picture of a slip, which is picked up by an image pickup device. From the digital picture data, the system extracts unregistered constituent elements such as characters and/or lines of rectangular frames, which are printed on the slip. Herein, extraction of the constituent elements is performed using character identification areas, which are located on areas of characters printed on the slip. From the constituent elements, the system selects a first constituent element to meet a prescribed condition. Then, the first constituent element is compared with the registered constituent elements, which are stored in advance.

Next, the system further selects a second constituent element, which is clearly identified from the registered constituent elements, from the first constituent element on the basis of comparison result. Thus, the system registers the second constituent element therein.

To improve an identification precision, binary processing using different threshold values are performed on the digital picture data to produce first and second pictures derived from an original picture of the slip, for example. A dispersion value is calculated between data of corresponding areas of the first and second pictures. Thus, the system selects the first constituent element whose dispersion value is relatively small and which meets the prescribed condition.

Thus, it is possible to perform identification of the slips with ease and with a high identification precision.

BRIEF DESCRIPTION OF THE DRAWINGS

These and other objects, aspects and embodiment of the present invention will be described in more detail with reference to the following drawing figures, of which:

FIG. 1 is a block diagram showing a configuration of a document identification registration system in accordance with embodiment 1 of the invention;

FIG. 3A is an enlarged version of FIG. 2B;

FIG. 3B is an enlarged version of FIG. 2D;

FIG. 3C is an enlarged version of FIG. 2F;

DESCRIPTION OF THE PREFERRED EMBODIMENT

Figure 2A:
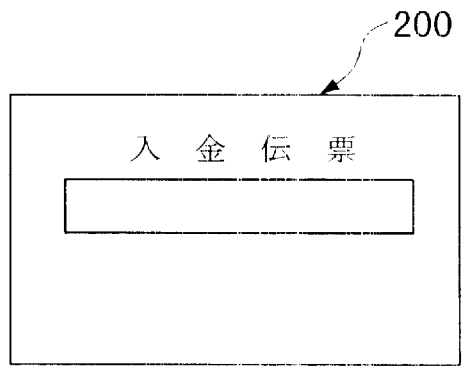
FIG. 2A shows an example of picture representing a deposit slip.

This invention will be described in further detail by way of examples with reference to the accompanying drawings.

[A] Embodiment 1

FIG. 1 is a block diagram showing a configuration of a document identification registration system in accordance with embodiment 1 of the invention. In FIG. 1, a slip picture input unit 10 deals with digital picture data, which should be registered and which are produced by image pickup devices such as image scanners and digital cameras, all of which are not shown. For convenience sake, the present embodiment deals with a variety of slips such as deposit slips and paying-in slips as examples of images corresponding to the digital picture data, wherein the slips are issued in Japan to use specific characters (called Chinese characters) used in the Japanese language. The slip picture input unit 10 produces identification area data 100 corresponding to a slip area 200 shown in FIG. 2A. On the top of the slip area 200, slip title characters showing a combination of Chinese characters of "入金伝票" (which represent "Deposit Slip" in English) are written, under which a rectangular frame (i.e., an in-frame area) is printed. As the slips used for registration, the present embodiment uses the slips on which characters and numbers such as the amounts of money, names and addresses of persons are not written yet.

A constituent element extraction unit 11 extracts constituent elements such as characters and rectangular frames from picture of the slip area 200 (see FIG. 2A), which is obtained from the identification area data 100, by some techniques called binary processing, labeling and projection, for example. Then, it outputs results of extraction as constituent element extraction data 101. A first constituent element selection unit 12 selects certain constituent elements from among the constituent elements obtained from the constituent element extraction data 101. Herein, the first constituent element selection unit 12 selects the constituent element which simultaneously meets all of three conditions or which simultaneously meet two out of the three conditions. Then, it outputs results of selection as constituent element data 102. The three conditions are described below.

(1) Condition 1

This condition is employed in the case where the slip title characters are used for identification of the slip. Elements of the condition 1 are as follows:

(a) Size of character pattern: a length of one side of each character ranges between 3 mm and 10 mm.

(b) Regularity of arrangement of characters: characters are arranged with approximately same pitches in a horizontal direction of the slip, while the characters conform with each other in widths and heights.

(2) Condition 2

This condition is employed in the case where the in-frame area is used for identification of the slip. Elements of the condition 2 are as follows:

(a) The in-frame area corresponds to a closed area.

(b) The in-frame area has a rectangular shape.

(c) Size of the in-frame area: a length of each side of the rectangle is 5 mm or more.

(d) Direction: each of the sides of the rectangle is drawn in a horizontal or vertical direction on the slip.

(3) Condition 3

This condition is employed in the case where line segments such as underlines are used for identification of the slip. Elements of the condition 3 are as follows:

(a) Line thickness: each of the line segments is drawn with approximately constant thickness, which ranges between 0.125 mm and 0.5 mm.

(b) Line length: the length of the line segment is 5 mm or more.

(c) Direction: the line segment is drawn in a horizontal or vertical direction.

A comparison unit 13 extracts a characterizing portion from a first constituent element represented by the first constituent element data 102. Then, it compares the characterizing portion with registered slip data 106, which are registered in advance with a slip identification dictionary 16.

Thus, the comparison unit 13 outputs a result of comparison as comparison data 103. Details in operations of the comparison unit 13 will be described later. The slip identification dictionary 16 is configured by a storage device that stores the registered slip data 106 representing other slips 300 and 400 shown in FIG. 2C and FIG. 2E, for example. Herein, FIG. 2C shows an example of a paying-in slip on which Chinese characters of 電気料金払込取扱票 (which represent "Electricity Charge Paying-In Slip" in English) are written, while FIG. 2E shows an example of a slip of statement of payment on which Chinese characters of 東京都府中市 (which represent "Tokyo Metropolitan Area, Fu-Chu City") and 個人市民税納付書 (which represent "Personal Civil Tax, Statement of Payment") are written.

Based on the comparison data 103, a second constituent element selection unit 14 selects a second constituent element from the first constituent element corresponding to the first constituent element data 102. Herein, it selects the second constituent element which can be clearly identified from constituent elements of the registered slip data 106. Then, the second constituent element selection unit 14 outputs a result of selection as second constituent element data 104. Next, a registration unit 15 registers the second constituent element data 104 and the identification area data 100 with the slip identification dictionary 16 as registration data 105.

Next, a description will be given with respect to operations of the document identification registration system of the embodiment 1 of this invention.

At first, digital picture data representing a picture of a slip which should be registered are produced by the image pickup device such as the image scanner (not shown) and are input to the slip picture input unit 10. The slip picture input unit 10 produces identification area data 100 corresponding to the slip area 200 shown in FIG. 2A, for example. Then, it outputs the identification area data 100 to the constituent element extraction unit 11.

Next, the constituent element extraction unit 11 extracts constituent elements from image of the slip area 200 shown in FIG. 2A. For example, it extracts the characters of 入金伝票 (i.e., "Deposit Slip") and the rectangular frame (i.e., in-frame area) which is located beneath the characters. Then, the constituent element extraction unit 11 outputs the extracted constituent elements to the first constituent element selection unit 12 as constituent element extraction data 101.

Thus, the first constituent element selection unit 12 selects from the aforementioned constituent elements corresponding to the constituent element extraction data 101 a first constituent element, which meets the aforementioned condition 1, for example.

Figure 2B:
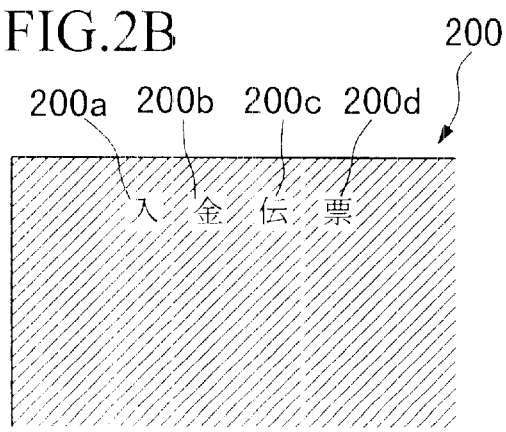
FIG. 2B shows character identification areas on the slip of FIG. 2A for selection of constituent elements.
Figure 2C:
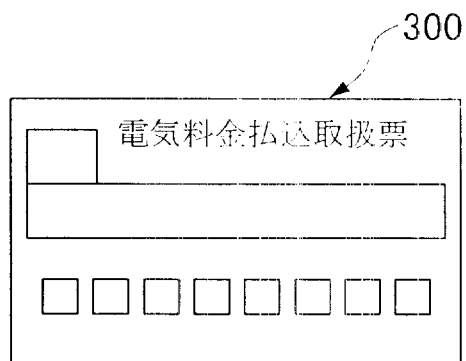
FIG. 2C shows an example of picture representing a paying-in slip.

Concretely speaking, from the constituent elements representing the characters of 入金伝票 and the rectangular frame, the first constituent element selection unit 12 selects the characters of 入金伝票 as the first constituent element that meets the condition 1 as shown in FIG. 2B. Then, the first constituent element selection unit 12 produces first constituent element data 102, which are forwarded to the comparison unit 13. As the first constituent element data 102, it uses data representing the characters of 入金伝票 and data of each of character identification areas 200a to 200d in which the characters are located respectively.

Figure 2D:
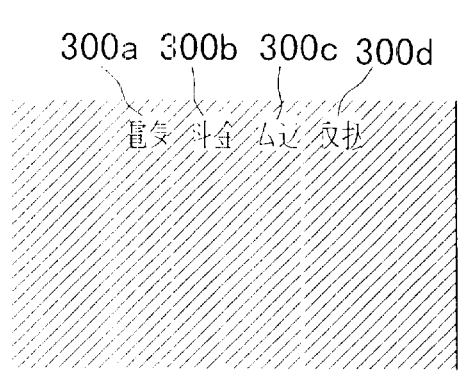
FIG. 2D shows character identification areas on the slip of FIG. 2C for selection of constituent elements.
Figure 2E:
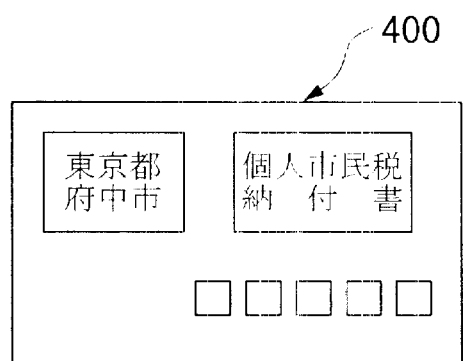
FIG. 2E shows an example of a slip for statement of payment.

The comparison unit 13 reads registered slip data 106, regarding the registered slip 300 shown in FIG. 2C, from the slip identification dictionary 16. Next, the comparison unit 13 extracts from the registered slip data 106 data of character identification areas 300*a* to 300*d* (see FIG. 2D) corresponding to the aforementioned character identification areas 200*a* to 200*d* shown in FIG. 2B. As shown in FIG. 2D, the character identification areas 300*a* to 300*d* roughly indicate four characters of 気金込扱 respectively within nine slip title characters of 電気料金払込取扱票 of the slip 300 shown in FIG. 2C.

Next, the comparison unit 13 compares each of the data of the character identification areas 300*a* to 300*d* (see FIG. 3B) with each of the data of the character identification areas 200*a* to 200*d* (see FIG. 3A). That is, the comparison unit 13 compares the four characters 気金込扱 respectively with the four characters of 入金伝票 Herein, it makes a decision as to whether the same or similar character exists between each of the areas 200*a* to 200*d* and each of the areas 300*a* to 300*d* or not. In the case of FIG. 3A and FIG. 3B, the character of 金 existed in the character identification area 200*b* coincides with the character of 金 existed in the character identification area 300*b*. Thus, the comparison unit 13 produces a result of comparison that the same character exists between the areas 200*b* and 300*b* while characters existed in the areas 200*a*, 200*c* and 200*d* do not coincide with characters existed in the areas 300*a*, 300*c* and 300*d* respectively. Then, the comparison unit 13 outputs the result of comparison thereof as comparison data 103, which are forwarded to the second constituent element selection unit 14.

Figure 2F:
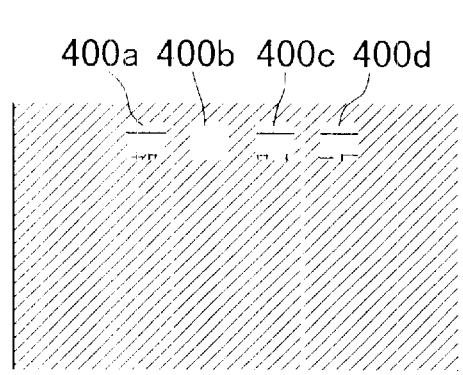
FIG. 2F shows character identification areas on the slip of FIG. 2E for selection of constituent elements.

Similarly, the comparison unit 13 performs comparison with respect to the registered slip 400 shown in FIG. 2E. That is, the comparison unit 13 reads registered slip data 106 regarding the registered slip 400 of FIG. 2E from the slip identification dictionary 16. Then, the comparison unit 13 extracts from the registered slip data 106 data of character identification areas 400*a* to 400*d* (see FIG. 2F) which correspond to the aforementioned character identification areas 200*a* to 200*d* shown in FIG. 2B respectively. In FIG. 2F, the character identification areas 400*a* to 400*d* indicate parts of ruled lines and parts of characters which are incomprehensible in reading.

Next, the comparison unit 13 compares the data of the character identification areas 400*a* to 400*d* (see FIG. 3C) with the foregoing data of the character identification areas 200*a* to 200*d* (see FIG. 3A) respectively. That is, the parts of the ruled lines and the parts of the characters existed in the areas 400*a* to 400*d* are compared with the characters of 入金伝票 which are respectively existed in the areas 200*a* to 200*d*. Thus, the comparison unit 13 makes a decision as to whether the same or similar character exists between each of the areas 200*a* to 200*d* and each of the areas 400*a* to 400*d*. In the case of FIG. 3A and FIG. 3C, the comparison unit 13 produces a result of comparison declaring that the data of the areas 400*a* to 400*d* do not at all coincide with the data of the areas 200*a* to 200*d*. Thus, it outputs the result of comparison to the second constituent element selection unit 14.

Based on the comparison data 103, the second constituent element selection unit 14 selects from the first constituent element corresponding to the first constituent element selection data 102 the second constituent element which can be clearly identified from the registered slip data 106. For example, the second constituent element selection unit 14 selects characters of 入伝票 from the slip title characters of 入金伝票 as the second constituent element, which is then forwarded to the registration unit 15 as second constituent element data 104.

Thus, the registration unit 15 combines the second constituent element data 104 (representing the characters of 入伝票 and the identification area data 100 together to form registration data 105, which are then stored in the slip identification dictionary 16.

As described heretofore, according to the document identification registration system of the embodiment 1 of the invention, it is possible to automatically extract the constituent element(s) for identification, thus, it is possible to perform registration of the slip(s) with ease.

In addition, the document identification registration system of the embodiment 1 is designed such that the second constituent element selection unit 14 selects the second constituent element which is effective for identification of the slip. Thus, it is possible to improve the identification precision.

[B] Embodiment 2

With reference to FIG. 1, a description will be given with respect to a document identification registration system in accordance with embodiment 2 of the invention.

Functions of the comparison unit 13, second constituent element selection unit 14, registration unit 15 and slip identification dictionary 16 employed in the embodiment 2 are identical to those employed in the embodiment 1; hence, the description thereof will be omitted. So, the embodiment 2 will be described in detail with respect to functions of the slip picture input unit 10, constituent element extraction unit 11 and first constituent element selection unit 12.

Figure 4A:
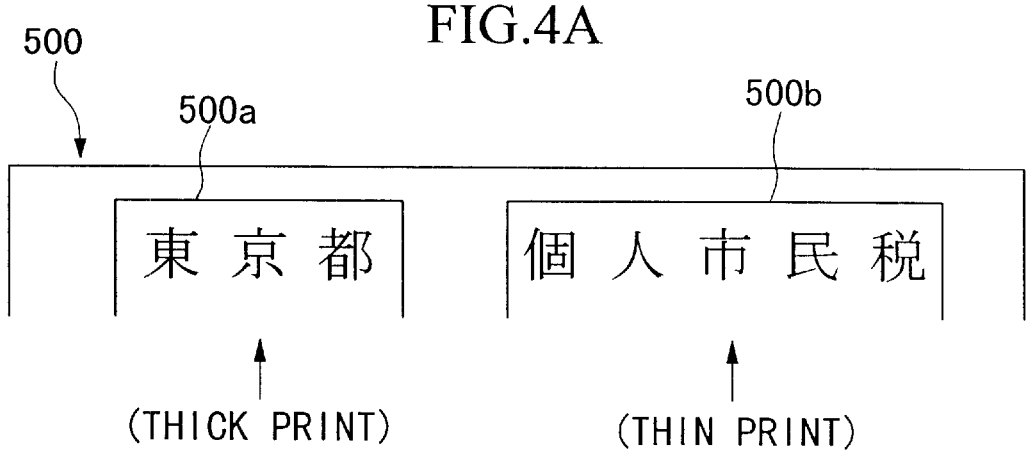
FIG. 4A shows an example of a slip area of a slip of statement of payment, which is used to explain operation of embodiment 2 of the invention.

The slip picture input unit 10 employed in the embodiment 2 certainly inputs "multivalued" digital picture data. For example, the slip picture input unit 10 produces identification area data 100 corresponding to a slip area 500 shown in FIG. 4A, which is a part of the aforementioned slip 400 shown in FIG. 2E. The slip area 500 includes areas 500*a* and 500*b*. Slip title characters of 東京都 representing "Tokyo Metropolitan Area" exists in the area 500*a* with thick print, while characters of 個人市民税 representing "Personal Civil Tax" exists in the area 500*b* with thin print.

The constituent element extraction unit 11 performs binary processing on picture data of the slip area 500, which are obtained from the identification area data 100. Herein, the binary processing is performed using two kinds of slice levels, e.g., high and low threshold values. Thus, the constituent element extraction unit 11 extracts constituent elements such as characters and rectangular frames. Then, it outputs results of extraction as constituent element extraction data 101. Incidentally, details of operation of the constituent element extraction unit 11 employed in the embodiment 2 will be described later.

The first constituent element selection unit 12 performs selection process to select constituent elements from among the multiple constituent elements corresponding to the constituent element extraction data 101. Herein, the constituent elements are selected such as to simultaneously meet all of the aforementioned conditions 1 to 3, regarding the character pattern, regularity of arrangement and the like, or simultaneously meet two out of the three conditions 1 to 3. Further, the first constituent element selection unit 12 calculates a dispersion value with respect to the selected constituent elements. Based on the dispersion value, the first constituent element selection unit 12 further performs selection process on the selected constituent elements. Details of processing to calculate the dispersion value in the first constituent element selection unit 12 will be described later.

Next, a description will be given with respect to operations of the document identification registration system of the embodiment 2 described above.

Now, the image pickup device such as the image scanner (not shown) produces multivalued digital picture data of a slip, which should be registered and which are input to the slip picture input unit 10. Thus, the slip picture input unit 10 produces identification area data 100 corresponding to the slip area 500 shown in FIG. 4A, so that the identification area data 100 are forwarded to the constituent element extraction unit 11.

Figure 4B:
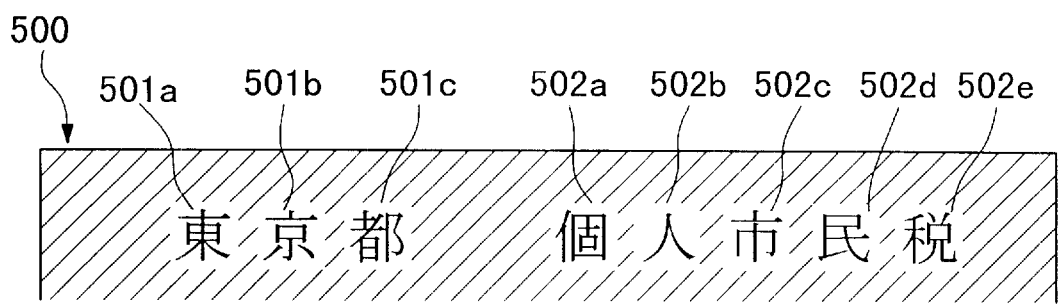
FIG. 4B shows character identification areas on the slip area of FIG. 4A, which are used for extraction of constituent elements.

Next, the constituent element extraction unit 11 firstly performs binary processing, using a slice level of low threshold value, on picture data of the slip area 500, which are obtained from the identification area data 100. FIG. 4B shows a result of the binary processing, according to which because of the low slice level, the constituent element extraction unit 11 extracts the thick-printed characters of 東京都 as well as the thin-printed characters of 個人市民税 as constituent elements. In FIG. 4B, character identification areas 501a to 501c are provided for the three characters of 東京都 respectively, while character identification areas 502a to 502e are provided for the five characters of 個人市民税 respectively.

Then, the constituent element extraction unit 11 outputs results of extraction shown in FIG. 4B as constituent element extraction data 101.

Figure 4C:
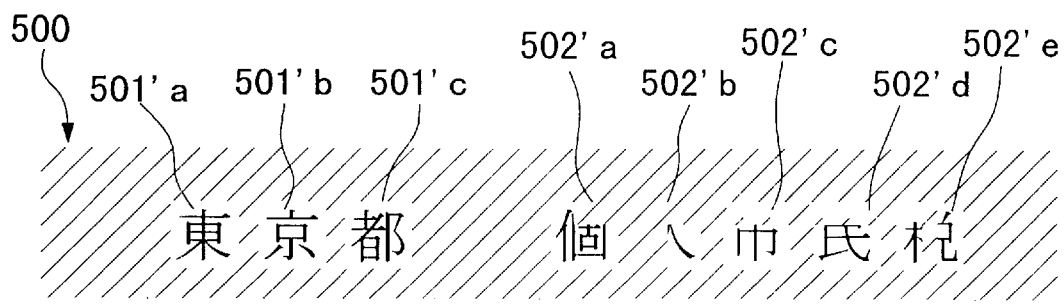
FIG. 4C shows character identification areas on the slip area of FIG. 4A, which are used for selection of first constituent element.

Next, the constituent element extraction unit 11 performs binary processing using the slice level of high threshold value on the data of the slip area 500, which are produced from the identification area data 100. FIG. 4C shows a result of the binary processing, in which the constituent element extraction unit 11 is capable of extracting the thick-printed characters of 東京都 while it is almost incapable of extracting the thin-printed characters of 個人市民税 In FIG. 4C, character identification areas 501a' to 501c' are provided for the three characters of 東京都 respectively while character identification areas 502a' to 502e' are provided for the five characters of 個人市民税 respectively.

Then, the constituent element extraction unit 11 outputs results of extraction to the first constituent element selection unit 12 as constituent element extraction data 101.

Based on the constituent element extraction data 101, the first constituent element selection unit 12 compares each of the character identification areas 501a to 501c (see FIG. 4B) with each of the character identification areas 601a' to 501e' (see FIG. 4C) with respect to size of area. Thus, the first constituent element selection unit 12 produces a dispersion value. In the case of FIG. 4B and FIG. 4C, both of the corresponding areas are same in size of area. So, the dispersion value must be small.

Similarly, based on the constituent element extraction data 101, the first constituent element selection unit 12 compares each of the character identification areas 502a to 502e with each of the character identification areas 502a' to 502e' in size of area, so that it produces a dispersion value. In the case of FIG. 4B and FIG. 4C, sizes of the character identification areas 502a' to 502e' are smaller than those of the character identification areas 502a to 502e. Thus, the dispersion value must be large.

Next, the first constituent element selection unit 12 selects from the multiple constituent elements obtained from the constituent element extraction data 101 the first constituent element which meets the aforementioned condition 1, for example.

Concretely speaking, the first constituent element selection unit 12 selects from the characters of 東京都 and 個人市民税 (see FIG. 4A) the characters of 東京都 (see FIG. 4B) whose dispersion value is small and which meet the condition 1 as the first constituent element. Next, the first constituent element selection unit 12 combines the characters of 東京都 and data of the "rectangular" character identification areas 501a to 501c, in which the characters exist respectively, to form first constituent element data 102, which are then forwarded to the comparison unit 13. Thereafter, the embodiment 2 performs operations similar to the foregoing operations of the comparison unit 13, second constituent element selection unit 14 and registration unit 15 employed in the embodiment 1.

As described heretofore, according to the document identification registration system of the embodiment 2, the first constituent element selection unit 12 is designed to select from the characters of 東京都 and 個人市民税 (see FIG. 4A) the characters of 東京都 (see FIG. 4B) whose dispersion value is small and which meet the condition 1 as the first constituent element. Therefore, even if picture quality of the slip is not so good, it is possible to extract the first constituent element (and second constituent element) in a stable manner.

So, even if variations occur in picture quality of the slip, the document identification registration system of the embodiment 2 is capable of identifying the slip in a stable manner without reducing identification precision.

[C] Modifications

In the above, the embodiments of the invention are described in detail with reference to the drawings. Of course, this invention is not limited in concrete configuration by the aforementioned embodiments. Therefore, this invention embraces design changes or modifications which do not depart from the subject matter of the invention. For example, the embodiments of the invention can be redesigned to cope with the following modifications.

(1) The document identification registration system of the embodiments 1 and 2 can be redesigned to cope with "color" picture data corresponding to the digital picture data input to the slip picture input unit 10. In this case, the system uses the area split method such as the labeling and projection method after effecting color separation process.

(2) The document identification registration system of the embodiments 1 and 2 do not care about kinds of the digital picture data. As the digital picture data which are applicable to this invention, it is possible to list black-and-white (or monochrome) two-valued picture data, black-and-white multivalued picture data and color picture data.

(3) The document identification registration system of the embodiments 1 and 2 performs comparison with respect to the registered slip 300 (see FIG. 2C) without changing sizes of the four character identification areas (i.e., 200a to 200d shown in FIG. 2B which are used for the slip 200 shown in FIG. 2A), for example. However, it is possible to adequately change sizes of the character identification areas to cope with the type of the slip. For instance, it is possible to enlarge the sizes of the character identification areas, or it is possible to shift positions of the character identification areas.

(4) The document identification registration system can be redesigned to have a capability to correct positional deviations and skews for extracting data of the character identification areas. Thus, it is possible to further improve the identification precision for identification of the slips.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A document identification registration system comprising:
   image pickup means for producing picture data of a document which should be registered;
   constituent element extraction means for extracting unregistered constituent elements of the document on the basis of the picture data;
   storage means for storing data of registered documents which have been already registered;
   comparison means for comparing the unregistered constituent elements with registered constituent elements obtained from the data of the registered documents;
   first selection means for selecting a first constituent element, wherein the first constituent element is identified from the registered constituent elements, from among the unregistered constituent elements on the basis of comparison result of the comparison means;
   second selection means for selecting a second constituent element from within the first constituent element on the basis of comparison result of the comparison means, wherein the second constituent element is identified from the registered constituent elements; and
   registration means for registering the picture data and the first and second constituent elements related to the picture data with the storage means.

2. A document identification registration system comprising:
   image pickup means for producing picture data of a document which should be registered;
   binary processing means for performing binary processing, using a plurality of threshold values, on the picture data, so that the binary processing means produces a plurality of binary processed pictures;
   constituent element extraction means for respectively extracting a plurality of unregistered constituent elements of the document from the plurality of binary processed pictures;
   first selection means for recognizing mutual variations of areas between the plurality of the unregistered constituent elements so as to select the unregistered constituent elements whose mutual variations of areas are relatively small;
   storage means for storing data of registered documents which have been already registered;
   comparison means for comparing the unregistered constituent elements selected by the first selection means with registered constituent elements obtained from the data of the registered documents;
   second selection means for selecting a first constituent element, which can be identified from the registered constituent elements, from among the unregistered constituent elements on the basis of comparison result of the comparison means;
   third selection means for selecting a second constituent element from the first constituent element on the basis of comparison result of the comparison means, wherein the second constituent element is clearly identified from the registered constituent elements; and
   registration means for registering the picture data and the first and second constituent elements related to the picture data with the storage means.

3. A document identification registration system according to claim 1 wherein the comparison means performs comparison while changing a size of an area for identification of the unregistered constituent element.

4. A document identification registration system according to claim 1 wherein the document corresponds to a slip.

5. A document identification registration system comprising:
   document picture input means for inputting picture data of a document newly presented;
   constituent element extraction means for extracting constituent elements from the picture data of the document;
   first selection means for selecting a first constituent element from among the constituent elements to meet a prescribed condition;
   storage means for storing registered constituent elements;
   comparison means for comparing the first constituent element with the registered constituent elements;
   second selection means for selecting a second constituent element from the first constituent element on the basis of comparison result of the comparison means, wherein the second constituent element is clearly identified from the registered constituent elements; and
   registration means for registering the second constituent element with the storage means as a new registered constituent element.

6. A document identification registration system according to claim 5, wherein the constituent elements correspond to characters and/or line segments constructing a rectangular frame, which are printed on the document.

7. A document identification registration system according to claim 5, wherein the constituent element extraction means uses a character identification area for extraction of the constituent element, wherein the character identification area is located on an area of a character printed on the document.

8. A document identification registration system according to claim 5, wherein the constituent element extraction means performs binary processing using different threshold values to produce first and second pictures respectively including the constituent elements based on an original picture of the document, so that a dispersion value is calculated between data of corresponding areas of the first and second pictures with regard to the constituent elements; and
   wherein the first selection means selects the first constituent element whose dispersion value is relatively small between the first and second pictures and which meets the prescribed condition.

9. A document identification registration system according to claim 5 wherein the document corresponds to a slip.

10. A document identification registration method comprising the steps of:
    producing picture data of a document which should be registered;
    extracting unregistered constituent elements of the document on the basis of the picture data;

storing data of registered documents which have been already registered;

comparing the unregistered constituent elements with registered constituent elements obtained from the data of the registered documents;

selecting a first constituent element, which can be identified from the registered constituent elements, from among the unregistered constituent elements on the basis of comparison result of the comparison means;

selecting a second constituent element from the first constituent element on the basis of comparison result of the comparison means, wherein the second constituent element is clearly identified from the registered constituent elements; and registration means for registering the picture data and the first and second constituent elements related to the picture data with the storage means.

\* \* \* \* \*